(12) United States Patent
Urayama (10) Patent No.: US 12,227,418 B2
(45) Date of Patent: *Feb. 18, 2025

(54) METHOD OF RECYCLING CARBON FIBERS

(71) Applicant: TOYOTA JIDOSHA KABUSHIKI KAISHA, Toyota (JP)

(72) Inventor: Hiroshi Urayama, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 735 days.

This patent is subject to a terminal disclaimer.

(21) Appl. No.: 17/502,459

(22) Filed: Oct. 15, 2021

(65) Prior Publication Data

US 2022/0162072 A1 May 26, 2022

(30) Foreign Application Priority Data

Nov. 24, 2020 (JP) ................................. 2020-194000

(51) Int. Cl.
| | |
|---|---|
| *C01B 32/05* | (2017.01) |
| *B29B 17/02* | (2006.01) |
| *B29K 307/04* | (2006.01) |
| *B29L 31/00* | (2006.01) |

(52) U.S. Cl.
CPC .......... *C01B 32/05* (2017.08); *B29B 17/0206* (2013.01); *B29B 2017/0293* (2013.01); *B29K 2307/04* (2013.01); *B29L 2031/7172* (2013.01)

(58) Field of Classification Search
CPC ................ C01B 32/05; B32B 17/0206; B32B 2017/0293; B29L 2031/7172; B29K 2307/04

USPC ........................................................... 521/40
See application file for complete search history.

(56) References Cited

U.S. PATENT DOCUMENTS

| | | | | |
|---|---|---|---|---|
| 10,167,378 | B2* | 1/2019 | Urayama | ................. C08K 7/06 |
| 10,343,305 | B2* | 7/2019 | Kano | ...................... B29B 17/02 |
| 10,829,611 | B1* | 11/2020 | Maxey | .................... C08L 61/06 |

(Continued)

FOREIGN PATENT DOCUMENTS

| | | |
|---|---|---|
| CN | 108912389 A | 11/2018 |
| CN | 110678507 A | 1/2020 |

(Continued)

OTHER PUBLICATIONS

Hirofumi Nishida, Journal vol. of the Japanese Society of Adhesion 51 No. 12 (2015), "The Development of Thermoplastic Epoxy Resin and Continuous Fiber Reinforced Thermoplastics using it", including English machine translation.

*Primary Examiner* — Michael M. Bernshteyn
(74) *Attorney, Agent, or Firm* — Dickinson Wright, PLLC (57) ABSTRACT

An object of the present disclosure is to provide a method of recycling carbon fibers that allows efficiently obtaining carbon fibers suitable for reuse. An embodiment is the method of recycling carbon fibers that includes: preparing a carbon fiber reinforced plastic molded product containing a carbon fiber reinforced plastic containing a carbon fiber and a resin; performing a process of at least one of a heating process or an ultraviolet irradiation process on the carbon fiber reinforced plastic molded product; and removing the resin after the process from the carbon fiber by injecting a first liquid to at least the carbon fiber of the carbon fiber reinforced plastic molded product after the process.

12 Claims, 7 Drawing Sheets

(56) References Cited

U.S. PATENT DOCUMENTS

| | | | | |
|---|---|---|---|---|
| 2010/0267868 A1* | 10/2010 | Takahashi | ............... | B29B 17/02 524/79 |
| 2015/0284541 A1* | 10/2015 | Urayama | ................ | C10B 51/00 422/164 |
| 2017/0157801 A1* | 6/2017 | Yang | ........................ | B29B 17/02 |
| 2019/0099921 A1* | 4/2019 | Kano | ...................... | B29B 17/02 |
| 2019/0240871 A1 | 8/2019 | Janssen | | |
| 2020/0079918 A1 | 3/2020 | Toyoshima et al. | | |
| 2022/0010463 A1 | 1/2022 | Watanabe et al. | | |

FOREIGN PATENT DOCUMENTS

| | | |
|---|---|---|
| DE | 10 2016 117 559 A1 | 3/2018 |
| EP | 3626769 A1 | 3/2020 |
| JP | 2001347523 A | 12/2001 |
| JP | 2005255835 A | 9/2005 |
| JP | 2008013614 A | 1/2008 |
| JP | 2015000897 A | 1/2015 |
| JP | 2015199827 A | 11/2015 |
| JP | 2017104847 A | 6/2017 |
| JP | 2019529177 A | 10/2019 |
| JP | 2020037638 A | 3/2020 |
| JP | 2020050704 A | 4/2020 |
| JP | 2022015366 A | 1/2022 |
| WO | 2018212016 A1 | 11/2018 |

\* cited by examiner

METHOD OF RECYCLING CARBON FIBERS

CROSS REFERENCE TO RELATED APPLICATIONS

The present application claims priority from Japanese patent application JP 2020-194000 filed on Nov. 24, 2020, the entire content of which is hereby incorporated by reference into this application.

BACKGROUND

Technical Field

The present disclosure relates to a method of recycling carbon fibers.

Background Art

A carbon fiber reinforced plastic (CFRP) is a material that is lightweight, has high rigidity, and can withstand high pressure hydrogen. Therefore, it is used for carbon fiber reinforced plastic molded products, such as hydrogen tanks of fuel cell (FC) vehicles. In addition, the carbon fiber reinforced plastic molded products are used in a wide range of fields, such as products for sports and leisure purposes and components for aerospace use, as well as the tanks. However, carbon fibers contained in the carbon fiber reinforced plastic are expensive and involve high environmental load because they generate a large amount of $CO_2$ during production and are difficult to be disposed of. Therefore, a method of collecting and recycling the carbon fibers from a used carbon fiber reinforced plastic molded product has been examined.

For example, JP 2017-104847 A discloses a reinforcement fiber collection method including an unwinding step of unwinding reinforcement fibers while separating a resin from a reinforced component, a sizing step of causing the unwound reinforcement fibers to pass through a sizing liquid to coat the reinforcement fibers with the sizing liquid, and a winding step of winding the reinforcement fibers coated with the sizing liquid to a mandrel. Furthermore, JP 2017-104847 A discloses an aspect that includes, as the unwinding step, a swelling step of immersing the reinforced component in a swelling liquid to swell the resin in the reinforced component, a dissolving step of causing the reinforcement fibers to pass through a dissolution liquid while unwinding the reinforcement fibers from the reinforced component to dissolve the resin impregnated to the reinforcement fibers, and an intermediate winding step of winding the reinforcement fibers in which the resin has been dissolved via an intermediate winder. JP 2017-104847 A discloses carbon fibers as the reinforcement fibers.

JP 2005-255835 A discloses a separation method of a carbon material/acid anhydride cured epoxy resin composite material. The separation method of a carbon material/acid anhydride cured epoxy resin composite material uses a process liquid containing an alkali metal compound and an organic solvent and dissolves and/or decomposes a resin cured product for separation into a carbon material, a solution of the resin cured product and/or a decomposed product. JP 2005-255835 A discloses carbon fibers as a carbon material.

JP 2008-13614 A discloses a separation method of reinforcement fibers. To separate reinforcement fibers from a waste of a fiber reinforced plastic product produced by impregnating a thermosetting resin to reinforcement fibers, the separation method of a reinforcement fibers brings the waste of the fiber reinforced plastic product into contact with high-temperature ethylene glycol or triethylene glycol to dissolve the resin and separate the reinforcement fibers, and the ethylene glycol or the triethylene glycol is removed from the separated reinforcement fibers by water cleaning. JP 2008-13614 A discloses carbon fibers as the reinforcement fibers.

SUMMARY

As disclosed in JP 2017-104847 A, JP 2005-255835 A, and JP 2008-13614 A, the methods that collect the carbon fibers from the carbon fiber reinforced plastic molded products have been conventionally examined. As described above, JP 2017-104847 A has proposed providing the swelling step and the dissolving step. JP 2005-255835 A has proposed the dissolution and/or decomposition of the resin cured product using the process liquid containing the alkali metal compound and the organic solvent, and JP 2008-13614 A has proposed the contact with the high-temperature ethylene glycol or triethylene glycol.

That is, the conventional examinations have examined only the kind and the temperature of the liquid brought into contact with the carbon fibers unwound from the carbon fiber reinforced plastic molded products or the molded products.

However, examinations by the inventors have found that even when the carbon fibers are collected in accordance with the methods disclosed in JP 2017-104847 A, JP 2005-255835 A, and JP 2008-13614 A, a part of the resin or a part of a component derived from the resin still remains in the collected carbon fibers and attaches in some cases. The carbon fibers in which the resin or the component derived from the resin remained was a product not suitable for reuse.

Therefore, the present disclosure provides a method of recycling carbon fibers that allows efficiently obtaining carbon fibers suitable for reuse.

The present inventors have intensively studied to solve the above-described problem and found that the following method allows efficiently obtaining the carbon fibers suitable for reuse, thereby arriving at the present disclosure.

Exemplary aspects of embodiments will be described as follows.

(1) A method of recycling carbon fibers comprises:
   preparing a carbon fiber reinforced plastic molded product containing a carbon fiber reinforced plastic containing a carbon fiber and a resin;
   performing a process of at least one of a heating process or an ultraviolet irradiation process on the carbon fiber reinforced plastic molded product; and
   removing the resin after the process from the carbon fiber by injecting a first liquid to at least the carbon fiber of the carbon fiber reinforced plastic molded product after the process.

(2) The method according to (1) comprises immersing at least a part of the carbon fiber reinforced plastic molded product after the process in a second liquid,
   wherein the immersing is performed at least one of before or simultaneously by the removing of the resin after the process from the carbon fiber.

(3) The method according to (1) or (2),
   wherein the first liquid is injected to the carbon fiber reinforced plastic molded product.

(4) The method according to (1) or (2),
wherein the first liquid is injected to the carbon fiber drawn from the carbon fiber reinforced plastic molded product.
(5) The method according to any one of (1) to (4),
wherein a nozzle pressure for injecting the first liquid is 1 MPa or more.
(6) The method according to any one of (1) to (5),
wherein the first liquid is at least one liquid selected from an acidic solution, an organic solvent, a hydrogen peroxide solution, or an ionic liquid.
(7) The method according to (2),
wherein the second liquid is at least one liquid selected from an acidic solution, an organic solvent, a hydrogen peroxide solution, or an ionic liquid.
(8) The method according to (6) or (7),
wherein the organic solvent is at least one organic solvent selected from an aliphatic hydrocarbon-based solvent, an aromatic hydrocarbon-based solvent, an alcohol-based solvent, a ketone-based solvent, an ether-based solvent, an amide-based solvent, or an ester-based solvent.
(9) The method according to any one of (1) to (8),
wherein the first liquid has a temperature of from 0 to 100° C.
(10) The method according to (2) or (7),
wherein the second liquid has a temperature of from 0 to 100° C.
(11) The method according to any one of (1) to (10),
wherein the heating process is a process that heats the carbon fiber reinforced plastic molded product at a temperature of 400° C. or more.
(12) The method according to any one of (1) to (11),
wherein the heating process is performed with air purged.

The present disclosure allows providing the method of recycling carbon fibers that allows efficiently obtaining the carbon fibers suitable for reuse.

DETAILED DESCRIPTION

The embodiment is a method of recycling carbon fibers that includes: preparing a carbon fiber reinforced plastic molded product containing a carbon fiber reinforced plastic containing a carbon fiber and a resin; performing a process of at least one of a heating process or an ultraviolet irradiation process on the carbon fiber reinforced plastic molded product; and removing the resin after the process from the carbon fiber by injecting a first liquid to at least the carbon fiber of the carbon fiber reinforced plastic molded product after the process. The following will describe embodiments in detail.

According to the embodiment, it can be suppressed that the resin or a component derived from the resin remains in the carbon fibers. In a removing step in the embodiment, the first liquid is injected, that is, a pressure is applied to the first liquid to bring the first liquid into contact with the carbon fibers. Thus, the use of the pressure allows removing the resin after the process that attaches to the carbon fibers. In view of this, compared with the conventional method, the resin or the component derived from the resin remaining in the recycled carbon fibers can be significantly reduced. When the resin or the component derived from the resin remains in the carbon fibers, in a case where the carbon fibers are mixed with a new resin composition at reuse, the resin or the component derived from the resin is present between the new resin composition and the carbon fibers, making it difficult to regenerate a high-performance carbon fiber reinforced plastic molded product. Meanwhile, since the remaining resin or component derived from the resin is suppressed in the carbon fibers recycled in the embodiment, the carbon fibers recycled in the embodiment can be reused for various applications as high-quality carbon fibers. That is, the use of the carbon fibers recycled in the embodiment allows manufacturing high-performance carbon fiber reinforced plastic molded products again.

The carbon fiber reinforced plastic molded product contains the carbon fiber reinforced plastic containing the carbon fibers and the resin. The carbon fiber reinforced plastic molded product is not specifically limited, and includes, for example, a tank. The tank includes, for example, a hydrogen tank for storing hydrogen. Although, in the following examples, the tank will be described as an example of the carbon fiber reinforced plastic molded product, this embodiment is not limited to this. Note that, although the embodiment relates to the method of recycling the carbon fibers, the method of recycling the carbon fibers should be understood to mean a method of producing the carbon fibers.

Figure 1:
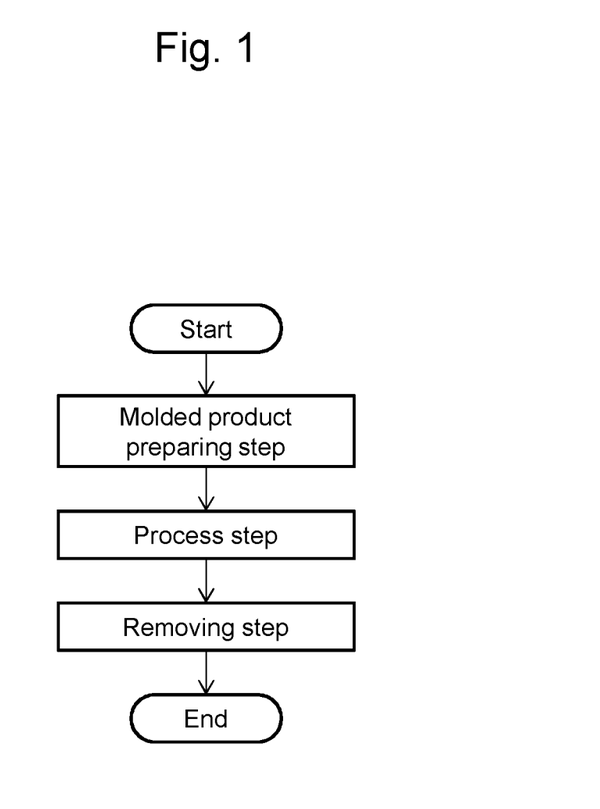
FIG. 1 is a flowchart for a method according to an embodiment.

FIG. 1 illustrates a flowchart of the method according to the embodiment. As illustrated in FIG. 1, the embodiment includes a molded product preparing step, a process step, and a removing step as necessary steps. The following will describe each step in detail.

(Molded Product Preparing Step)

The recycling method according to the embodiment includes a step of preparing the carbon fiber reinforced plastic molded product that contains the carbon fiber reinforced plastic containing the carbon fibers and the resin.

As described above, the carbon fiber reinforced plastic molded product is not specifically limited, and includes, for example, the tank. Examples of the carbon fiber reinforced plastic molded product prepared in the step includes a product that was used for each application after being manufactured and subsequently collected, and a defective product at a production stage.

Figure 2:
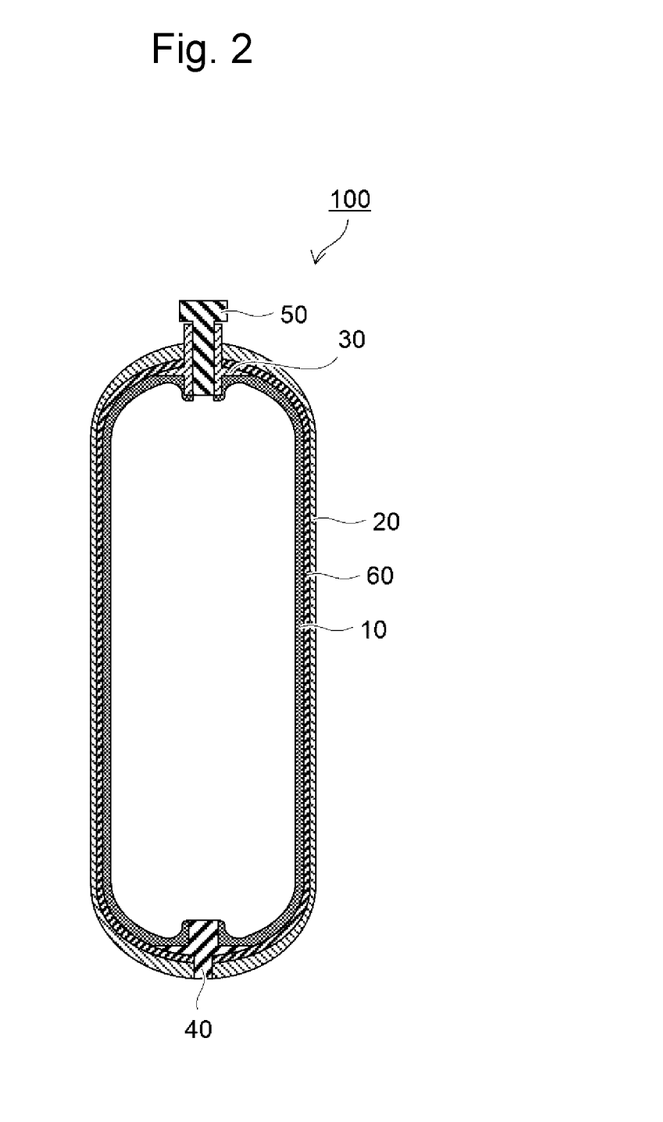
FIG. 2 is a schematic cross-sectional view illustrating an exemplary configuration of a tank 100 as a carbon fiber reinforced plastic molded product.

FIG. 2 is a cross-sectional view illustrating an exemplary configuration of a tank 100. FIG. 2 illustrates the cross-sectional view taken along a plane parallel to the central axis of the tank 100 and passing through the central axis. The central axis of the tank 100 matches the axis passing through the center of the circle of the tank main body having approximately cylindrical shape. The tank 100 can be used, for example, to fill a gas, such as compressed hydrogen. For example, the tank 100 is mounted on a fuel cell vehicle in a state of being filled with the compressed hydrogen in order to supply the hydrogen to a fuel cell device.

The tank 100 includes a liner 10 (made of nylon resin), a carbon fiber reinforced plastic layer 20 as an outer shell, a valve-side base 30, an end-side base 40, and a valve 50. Further, a protective layer 60 is arranged between the liner 10 and the carbon fiber reinforced plastic layer 20. The liner 10 has a hollow shape having a space where the hydrogen is filled inside and has a gas barrier property to seal the internal space such that the hydrogen does not leak outside.

The carbon fiber reinforced plastic layer 20 is a plastic layer formed to cover the outer side of the liner 10 and the protective layer 60. The carbon fiber reinforced plastic layer 20 is formed to cover the outer surface of the protective layer 60. The protective layer 60 is formed to cover the inner surface of the carbon fiber reinforced plastic layer 20 and is formed to partially cover the bases 30 and 40. The carbon fiber reinforced plastic layer has a function of reinforcing mainly the liner 10 (a reinforcing layer). The liner 10 is formed to cover the inner surface of the protective layer 60.

In FIG. 2, the valve-side base 30 has an approximately cylindrical shape and is inserted and secured between the liner 10 and the protective layer 60. The approximately column-shaped opening of the valve-side base 30 functions as the opening of the tank 100. While in the embodiment, the valve-side base 30 can be formed of, for example, stainless steel, the valve-side base 30 may be made of another metal, such as aluminum, and may be made of resin. The valve 50 has a male screw formed on the column-shaped portion and is screwed into a female screw formed on the internal surface of the valve-side base 30, and thus the opening of the valve-side base 30 is closed by the valve 50. The end-side base 40 can be made of, for example, aluminum, is assembled in a state of being partially exposed to the outside, and serves to conduct the heat inside the tank to the outside.

The carbon fiber reinforced plastic layer contains the carbon fibers and the resin (matrix resin).

The resin is not specifically limited, and includes, for example, phenol resin, urea resin, unsaturated polyester resin, vinylester resin, polyimide resin, bismaleimide resin, polyurethane resin, diallyl phthalate resin, epoxy resin, or a mixture of them. In some embodiments, the resin is an epoxy resin. As an epoxy resin, an epoxy resin conventionally known in the technical field can be used. The epoxy resin is not limited, and includes, for example, bisphenol A type epoxy resin, bisphenol AD type epoxy resin, bisphenol F type epoxy resin, phenol novolac type epoxy resin, cresol novolac type epoxy resin, and glycidyl ester type epoxy resin. The epoxy resin may be a straight chain type or a branched type. For the resin, one kind may be used alone, or two or more kinds may be used in combination. Examples of the resin include a thermoplastic resin or a thermosetting resin. The resin is a thermosetting resin in some embodiments.

The carbon fiber can be prepared by a method conventionally known in the technical field. As the carbon fiber, it is only necessary that the material contains carbon as the main component, and the carbon fiber includes, for example, a carbon fiber made of acrylic as the raw material, a carbon fiber made of pitch as the raw material, and a carbon fiber made of polyvinyl alcohol as a raw material. Among them, the carbon fiber is a PAN-based carbon fiber, which is produced from a polyacrylonitrile fiber as the raw material, in some embodiments. As the carbon fiber, a continuous fiber that allows further increasing the strength of the carbon fiber reinforced plastic layer and the strength of the tank is used in some embodiments. In comparison between a discontinuous fiber and a continuous fiber, the continuous fiber is generally difficult to be recycled. Therefore, from this aspect as well, the recycle method according to the embodiment is performed on the carbon fiber reinforced plastic molded product in which the carbon fibers are the continuous fibers in some embodiments.

The carbon fiber reinforced plastic layer can be formed by, for example, a filament winding method. A filament winding molded product can be produced by aligning a plurality of carbon fiber bundles as necessary, impregnating the carbon fiber bundles with the matrix resin, and winding the carbon fiber bundles at an appropriate angle around a rotating substrate body or a mold up to an appropriate thickness while applying tension.

(Process Step)

The recycle method according to the embodiment includes a step of performing at least one process of a heating process or an ultraviolet irradiation process on the carbon fiber reinforced plastic molded product.

The process step usually performs at least one of softening, deterioration, or decomposition of the resin in the carbon fiber reinforced plastic molded product. In this embodiment, the "softening of the resin" means that the resin becomes soft, and also includes the decrease in strength of the resin. The "deterioration of the resin" means a chemical change of the resin, such as a decrease in molecular weight due to partial cut of a main chain constituting the resin, or change of a part of the resin to another substance by heat, ultraviolet rays, oxygen, or the like, compared with the resin before the process. Note that the "deterioration of the resin" means a state in which a degree of change is lower than that of the "decomposition of the resin" described below and, for example, the decrease in molecular weight is observed compared with the resin before the process, but the resin after the process is a resin as a whole, in other words, a state of maintaining being high molecule. The "decomposition of the resin" means a chemical change to the state in which the resin becomes no longer a resin, such as turning into carbide due to, for example, the sooted and/or gasified resin. In this embodiment, the "resin after the process" refers to a concept including a softened resin, a deteriorated resin, and a decomposed resin.

Note that in the process step, the softening, the deterioration, or the decomposition may occur in the resin, but a plurality of them may occur simultaneously. For example, the resin may be partially softened and may be partially deteriorated, the resin may be partially deteriorated and may be partially decomposed, and the resin may be partially softened, may be partially deteriorated, and may be partially decomposed.

In this embodiment, the carbon fiber reinforced plastic molded product is not usually crushed or pulverized. In this embodiment, since the steps, such as crushing pulverization, need not be performed, when the carbon fibers contained in the carbon fiber reinforced plastic molded product are continuous fibers, the carbon fibers to be recycled can be obtained as the continuous fibers suitable for reuse. Only the tubular part of the tank may be used as the carbon fiber reinforced plastic molded product. For example, a metal component in the carbon fiber reinforced plastic molded product may be removed before the process step or may be removed after the process step.

The heating process can be performed in, for example, a heat treatment chamber. The carbon fiber reinforced plastic molded product is heated in the heat treatment chamber to process the matrix resin of the carbon fiber reinforced plastic molded product. The heat treatment chamber may be a heating furnace or a dry distillation-carbonization furnace, or may be a heating device having a space where heating medium can be introduced into and/or discharged from.

The heating process includes a high temperature heating process that mainly aims to decompose the resin and a low temperature heating process that mainly aims to soften and deteriorate the resin. Since a thermal property differs depending on the kind of the resin, the "high temperature" and the "low temperature" are not clearly defined. However, in the following description, for convenience, the "low temperature" means less than 400° C. and the "high temperature" means 400° C. or more.

One aspect of the embodiment is that the heating process is a process that heats the carbon fiber reinforced plastic molded product at a temperature of 400° C. or more, namely, a high-temperature heating process. As the high-temperature heating process, a method that processes the carbon fiber reinforced plastic molded product at the temperature of, for example, from 400 to 650° C. is included. As the high-temperature heating process, for example, the process disclosed as the thermal decomposition step disclosed in JP 2015-199827 A is included. As a specific example, the high-temperature heating process can be performed using a dry distillation-carbonization furnace to decompose (carbonize) the resin. The dry distillation-carbonization furnace usually includes a main body, a dry distillation-carbonization chamber arranged inside the main body, and a combustion chamber arranged on the lower side of the dry distillation-carbonization chamber, and all of them are made of a heat-resistant material, usually a metal. The carbon fiber reinforced plastic molded product is housed in the dry distillation-carbonization chamber. A fuel and a gas (a decomposition gas), such as hydrocarbon, generated by decomposing a part of the resin constituting the carbon fiber reinforced plastic molded product during the heat treatment are burnt in the combustion chamber, thus allowing performing the high-temperature heating process on the carbon fiber reinforced plastic molded product.

To perform the high-temperature heating process, the temperature of the heating process is from 400 to 650° C. in some embodiments and from 400 to 500° C. in some embodiments. Within the ranges, the decomposition of the resin promptly proceeds, and damage of the carbon fibers can be suppressed.

From aspects of suppressing decomposition and damage of the carbon fibers, the high-temperature heating process is performed under air purged atmosphere in some embodiments. The method of purging air is a method that, for example, supplies superheated steam in some embodiments. Supplying the superheated steam to the dry distillation-carbonization chamber or the like in which the carbon fiber reinforced plastic molded product is housed allows purging air. The superheated steam usually has a temperature of 100 to 700° C., a temperature of 400 to 650° C. in some embodiments, and a temperature of 400 to 500° C. in some embodiments. As the method for purging air, other than the method of supplying the superheated steam, a method that supplies an inert gas, such as nitrogen, and a method that supplies superheated steam and an inert gas may be employed.

The period of the high-temperature heating process (the heating period) is not specifically limited, but can be appropriately set according to the heating temperature, the resin, and the like. The heating period is, for example, from 30 minutes to 10 hours and from 2 to 5 hours in some embodiments.

The decomposition degree of the resin in the high-temperature heating process can be controlled with the temperature of the heating process and the period of the heating process. When the temperature of the heating process is too high, the carbon fibers tend to become brittle, and when the temperature of the heating process is too low, the remaining amount of the resin after the process tends to increase. When the period of the heating process is too long, the carbon fibers tend to become brittle, and when the period of the heating process is too short, the remaining amount of the resin after the process tends to increase. A part of the resin decomposes through the high-temperature heating process, and after the process, the residue of the resin as the resin after the process attaches to the carbon fiber. When the mass of the resin before the process is assumed as 100 mass %, the resin that attaches to the carbon fibers after the process has an amount of 5 to 15 mass % in some embodiments and an amount of 7 to 13 mass % in some embodiments. In other words, an amount of 85 to 95 mass % of the resin before the process is decomposed by the high-temperature heating process in some embodiments, and an amount of 87 to 93 mass % of the resin before the process is decomposed in some embodiments.

The resin after the process (the residue of the resin) attaches to the carbon fibers after the high-temperature heating process. The residue of resin allows the carbon fibers to keep the configuration of a bundle shape. When the carbon fibers collected with the residue remained are mixed with the new resin composition for reuse, the residue remains between the resin composition and the carbon fibers. Therefore, adhesiveness becomes low and the carbon fiber reinforced plastic having a sufficient physical property cannot be regenerated, and the carbon fiber reinforced plastic is inadequate for reuse. In this embodiment, the residue of the resin is removed by the removing step described later.

One aspect of the embodiment is that the heating process is a process that heats the carbon fiber reinforced plastic molded product at the temperature less than 400° C., namely, a low temperature heating process. As the low temperature heating process, a method that processes the carbon fiber reinforced plastic molded product, for example, at a temperature of a glass-transition temperature of the resin or more and less than 400° C. is included. The heating temperature being the glass-transition temperature of the resin or more allows sufficiently softening the resin and allows removing the resin. Although the step is an optional, the step facilitates drawing the continuous carbon fibers. The heating temperature is, for example, 375° C. or less, 350° C. or less, or 325° C. or less. The heating temperature is, for example, 200° C. or more, 225° C. or more, 250° C. or more, or 275° C. or more.

The heating temperature in the low temperature heating process is, for example, the glass-transition temperature of resin or more and less than a decomposition start temperature. With the heating temperature being less than the decomposition start temperature of the resin, the resin can be softened while the deterioration of the carbon fibers can be further efficiently suppressed. Additionally, since the resin is softened, the continuous carbon fibers can be drawn from the carbon fiber reinforced plastic molded product. The decomposition start temperature can be measured with, for example, thermogravimetric-differential thermal analyzer (TG-DTA).

Another example of the heating temperature in the low temperature heating process is the decomposition start temperature of the resin or more and less than 400° C. The heating temperature of the decomposition start temperature of the resin or more allows sufficiently softening the resin and also allows deteriorating the resin and partially decomposing the resin. This also further facilitates drawing the continuous carbon fibers from the carbon fiber reinforced plastic molded product. Specifically, heating the molded product at the decomposition start temperature of the resin or more and less than 400° C. allows decreasing the strength of the resin while suppressing the deterioration of the carbon fiber. In this respect, the resin may be partially decomposed. When the drawing step is performed after the heating process, the strength of the resin decreases, and the carbon fibers can be easily drawn.

As one example, the glass-transition temperature of an epoxy resin is around from 100° C. to 200° C., and the decomposition start temperature of the epoxy resin is around from 240° C. to 300° C. Heating at the decomposition start temperature or more softens the resin and causes partial decomposition to decrease the strength of the resin.

The heating method at the low temperature heating process is not specifically limited. An example of the heating method can include heating in the air. The heating process in the air can be easily performed and is advantageous in terms of cost. Especially, since the low temperature heating process allow suppressing the deterioration of the carbon fibers even under a condition where oxygen, such as atmosphere, is present, and therefore is performed in some embodiments. The low temperature heating process may be performed with air purged. The heating process with air purged can be performed using, for example, superheated steam. The use of the superheated steam allows effectively suppressing the decomposition and the damage of the carbon fiber. For example, the heating can be performed by introducing normal pressure superheated steam to a normal pressure reaction vessel. While the heating is not specifically limited, the heating may be performed under inert gas atmosphere, such as nitrogen.

The period of the low temperature heating process (the heating period) is not specifically limited, but can be appropriately set according to the heating temperature, the resin, and the like. The heating period is, for example, from 30 minutes to 10 hours, and from 2 to 5 hours in some embodiments.

The degree of softening of the resin in heating can be appropriately adjusted by the heating temperature and the heating period.

The ultraviolet irradiation process can be performed, for example, in an ultraviolet irradiation device. Irradiating the carbon fiber reinforced plastic molded product with ultraviolet rays in the ultraviolet irradiation device allows processing the matrix resin of the carbon fiber reinforced plastic molded product. The ultraviolet irradiation device only needs to can irradiate ultraviolet rays, and as a light source, for example, a super high pressure mercury UV lamp, a high pressure mercury UV lamp, a metal halide UV lamp, a low pressure mercury UV lamp, and an LED can be used.

The ultraviolet irradiation causes the softening, the deterioration, the decomposition, or the like of the resin, and this causes a decrease in molecular weight, a decrease in melting point, a decrease in strength, or the like of the resin.

UV illuminance (UV strength) for ultraviolet irradiation is from 50 to 1000 mW/cm$^2$ in some embodiments and from 200 to 500 mW/cm$^2$ in some embodiments. An amount of exposed UV (an integrated amount of light) is from 100 to 2,000 mJ/cm$^2$ in some embodiments and from 500 to 1,000 mJ/cm$^2$ in some embodiments. Within the ranges, the process of the resin promptly proceeds, and damage of the carbon fibers can be suppressed.

The process step according to the embodiment performs a process of at least one of the heating process or the ultraviolet irradiation process. Specifically, the heating process may be performed, the ultraviolet irradiation process may be performed, or the heating process and the ultraviolet irradiation process may be performed. When the heating process is performed, the high-temperature heating process may be performed, the low temperature heating process may be performed, and the high-temperature heating process and the low temperature heating process may be performed. In the process step, when a plurality of processes are performed, its order is not specifically limited. One aspect as the process step is to perform the heating process that is easily performed.

(Removing Step)

The recycle method according to the embodiment includes a step of injecting a first liquid to at least the carbon fibers of the carbon fiber reinforced plastic molded product after the process to remove the resin after the process from the carbon fibers.

In the carbon fiber reinforced plastic molded product on which the process step has been performed, that is, the carbon fiber reinforced plastic molded product after the process, the resin after the process, such as the residue of the resin, attaches to the carbon fibers. The resin after the process is removed by the removing step. While the resin after the process is removed in this embodiment, the first liquid may be injected to the carbon fiber reinforced plastic molded product at the removing step, and the first liquid may be injected to the carbon fibers drawn from the carbon fiber reinforced plastic molded product at the removing step.

In order to remove the resin or the like attached to the carbon fibers, the conventional method brings the resin or the like into contact with a liquid. In the removing step according to this embodiment, the first liquid is injected, that is, a pressure is applied to the first liquid to bring the first liquid into contact with the carbon fiber. Thus, the use of the pressure allows removing the resin after the process that attaches to the carbon fiber. An injection device used to inject the first liquid is not specifically limited. For example, a device that can inject the first liquid from a nozzle by a pressure described later, for example, a high pressure cleaning device can be employed.

Although the first liquid is not specifically limited, at least one liquid selected from an acidic solution, an organic solvent, a hydrogen peroxide water, or an ionic liquid is used in some embodiments. The use of these liquids allows, for example, dissolving the resin after the process and swelling the resin after the process, in addition to removing the resin after the process by the pressure, thereby allowing more efficiently removing the resin after the process.

Examples of the acidic solution include phosphoric acid and sulfuric acid. Examples of the acidic solution include a solution containing sulfuric acid (for example, a concentration of 90 mass % or more) as disclosed in JP 2020-37638 A and a solution containing phosphoric acid as disclosed in JP 2020-50704 A.

Examples of the organic solvent include at least one organic solvent selected from an aliphatic hydrocarbon-based solvent, an aromatic hydrocarbon-based solvent, an alcohol-based solvent, a ketone-based solvent, an ether-based solvent, an amide-based solvent, or an ester-based solvent. One organic solvent may be used alone, or two or more organic solvents may be used. Examples of the aliphatic hydrocarbon-based solvent includes pentane, hexane, heptane, and octane. Examples of the aromatic hydrocarbon-based solvent includes benzene, toluene, and xylene. Examples of the two or more organic solvents include petroleum benzine and ligroin.

The organic solvent may contain a decomposition catalyst. An example of the decomposition catalyst includes the alkali metal compound as disclosed in JP 2020-45407 A.

Examples of the ionic liquid include an ionic liquid in which cation is at least one cation selected from imidazolium-based, pyridinium-based, pyrrolidinium-based, quaternary ammonium-based, or quaternary phosphonium-based cation.

The temperature (the liquid temperature) of first liquid at injection is from 0 to 100° C. in some embodiments and from 20 to 50° C. in some embodiments. The ranges are used in some embodiments because the resin after the process can be dissolved and the resin after the process can be swelled. In one embodiment, the temperature of the first liquid may be from 80 to 200° C.

A nozzle pressure when the first liquid is injected is 1 MPa or more in some embodiments, 5 MPa or more in some embodiments, 8 MPa or more in some embodiments, and 10 MPa or more in some embodiments. These pressures are used in some embodiments because the resin after the process attached to the carbon fibers can be efficiently removed. The nozzle pressure is 30 MPa or less in some embodiments, 25 MPa or less in some embodiments, 22 MPa or less in some embodiments, and 20 MPa or less in some embodiments. These pressures are used in some embodiments because damage of the carbon fibers by the first liquid is suppressed. A distance between the nozzle when the first liquid is injected and the injection target, for example, the carbon fiber reinforced plastic molded product and the carbon fibers drawn from the carbon fiber reinforced plastic molded product is from 10 to 200 cm in some embodiments and from 30 to 100 cm in some embodiments.

The first liquid is injected to the whole carbon fibers by appropriately moving the nozzle, the carbon fiber reinforced plastic molded product, and the carbon fibers drawn from the carbon fiber reinforced plastic molded product in some embodiments.

Although the injection period of the first liquid to any given part is different depending on the amount of the resin after the process attached to the carbon fibers and a strength of attachment of the resin after the process to the carbon fibers, the injection period is from 10 to 300 seconds in some embodiments and from 30 to 100 seconds in some embodiments. Although the injection period (the total injection period) of the first liquid to the whole carbon fiber reinforced plastic molded product or the whole carbon fibers drawn from the carbon fiber reinforced plastic molded product is different depending on the size of the carbon fiber reinforced plastic molded product, the amount of carbon fibers used for the carbon fiber reinforced plastic molded product, the amount of resin after the process, and the strength of attachment of the resin after the process to the carbon fibers, the injection period is from 0.5 to 5 hours in some embodiments and from 1 to 3 hours in some embodiments.

While the embodiment includes the above-described molded product preparing step, the process step, and the removing step, the embodiment may further include an optional step. As an optional step, a step of immersing at least a part of the carbon fiber reinforced plastic molded product after the process obtained in the process step in a second liquid (an immersing step), a step of drawing the carbon fibers from the carbon fiber reinforced plastic molded product, a step of causing a sizing agent to attach to the carbon fibers from which the resin has been removed obtained by the removing step, and a step of winding the carbon fibers from which the resin has been removed are included. Hereinafter, the optional steps will be described.

(Immersing Step)

The recycle method according to the embodiment may include the step of immersing at least a part of the carbon fiber reinforced plastic molded product after the process in the second liquid. The immersing step is performed in at least one of before or simultaneously with the step of removing the resin after the process from the carbon fiber, namely, the removing step in some embodiments. That is, in the case where the recycle method according to the embodiment includes the immersing step, the method may be performed in the order of the molded product preparing step, the process step, the immersing step, and the removing step, the method may be performed in the order of the molded product preparing step, the process step, and (the immersing step and the removing step), and the method may be performed in the order of the molded product preparing step, the process step, the immersing step, and (the immersing step and the removing step). Note that (the immersing step and the removing step) means simultaneously performing the immersing step and the removing step.

In the carbon fiber reinforced plastic molded product on which the process step has been performed, that is, the carbon fiber reinforced plastic molded product after the process, the resin after the process, such as the residue of the resin, attaches to the carbon fiber. The resin after the process is removed by the above-described removing step. Performing the immersing step allows further easily removing the resin after the process from the carbon fibers in the removing step. Performing the immersing step allows the second liquid to enter an interface between the resin after the process and the carbon fiber, thus weakening an attachment strength of the resin. Depending on the kind of the second liquid and the state of the resin after the process, performing the immersing step allows expanding the resin after the process and dissolving a part of the resin after the process. Therefore, in the removing step, the resin after the process can be further easily removed from the carbon fiber.

In the immersing step, the carbon fiber reinforced plastic molded product may be immersed in the second liquid, or the carbon fibers drawn from the carbon fiber reinforced plastic molded product may be immersed in the second liquid. To immerse the carbon fiber reinforced plastic molded product in the second liquid, the whole carbon fiber reinforced plastic molded product may be immersed in the second liquid, or a part of the carbon fiber reinforced plastic molded product may be immersed in the second liquid. To immerse a part of the carbon fiber reinforced plastic molded product in the second liquid, the carbon fiber reinforced plastic molded product is moved to immerse the whole carbon fiber reinforced plastic molded product in the second liquid over time in some embodiments.

Although the second liquid is not specifically limited, the liquid described as the first liquid above can be used. The first liquid and the second liquid may be the same kind of liquid or may be different kinds of liquids. To simultaneously perform the immersing step and the removing step, the first liquid and the second liquid are the same kind of liquid in some embodiments.

The temperature (the liquid temperature) of the second liquid is from 0 to 100° C. in some embodiments and from 20 to 50° C. in some embodiments. The ranges are used in some embodiments because the resin after the process can be dissolved and the resin after the process can be swelled. In one embodiment, the temperature of the second liquid may be from 80 to 200° C.

Although the immersion period of any given part in the second liquid is different depending on the amount of the resin after the process attached to the carbon fibers and a strength of attachment of the resin after the process to the carbon fibers, the immersion period is from 10 to 300 seconds in some embodiments and from 30 to 100 seconds in some embodiments. Although the immersion period (the total immersion period) of the whole carbon fiber reinforced plastic molded product or the whole carbon fibers drawn from the carbon fiber reinforced plastic molded product in the second liquid is different depending on the size of the carbon fiber reinforced plastic molded product, the amount of carbon fibers used for the carbon fiber reinforced plastic molded product, the amount of resin after the process, and the strength of attachment of the resin after the process to the carbon fibers, the immersion period is from 0.5 to 5 hours in some embodiments and from 1 to 3 hours in some embodiments.

(Step of Drawing Carbon Fibers)

The recycle method according to the embodiment may include a step of drawing the carbon fibers from the carbon fiber reinforced plastic molded product. The step of drawing the carbon fibers can be performed at any timing, and, for example, may be performed after the process step and before the removing step and the immersing step, may be performed after the immersing step and before the removing step, or may be performed after the removing step.

In this embodiment, "drawing the carbon fiber" means that the carbon fibers are continuously drawn from the carbon fiber reinforced plastic molded product and includes a concept of stripping the carbon fibers from the molded product. To draw the carbon fibers from the carbon fiber reinforced plastic molded product, an edge-shaped jig may be used for stripping.

While the method of drawing the carbon fibers is not specifically limited, and, for example, the carbon fibers are coupled to a winding roller and the roller is rotated, thus allowing drawing the carbon fibers.

(Sizing Agent Adding Step)

The recycle method according to the embodiment may include a step of causing the sizing agent to attach to the carbon fiber, from which the resin has been removed, obtained by the removing step.

In the carbon fibers after the removing step, all of the resin after the process is substantially removed, and the bundles of the carbon fibers are undone to be in a form of single fiber. By adding the sizing agent to this carbon fiber, the carbon fiber bundles can be wound up as a bobbin, and the occurrence of fluffing of the carbon fibers and entanglement of the single fibers can be suppressed.

The sizing agent is not specifically limited, and includes, for example, epoxy resin, urethane resin, vinylester resin, polyamide resin, nylon resin, polyolefin resin (polyethylene or polypropylene), polyester resin, phenol resin, or a mixture of them. Among them, the sizing agent is epoxy resin, urethane resin, vinylester resin, or polyolefin resin in some embodiments, and the sizing agent is epoxy resin in some embodiments. Use of the epoxy resin as the sizing agent can improve the adhesiveness between the carbon fibers and the epoxy resin. For the sizing agent, one kind may be used alone, or two or more kinds may be used in combination.

The sizing agent is added to the carbon fibers by bringing the sizing agent into contact with the carbon fiber. The method of adding the sizing agent is not specifically limited, and includes, for example, a dipping method, a die coating method, a bar coating method, a roll coating method, and a gravure coating method. Among them, the method employs the dipping method in some embodiments. Specifically, the sizing agent can be added to the carbon fibers by conveying the carbon fibers with a rotor such that the carbon fibers are immersed in the sizing agent arranged in a sizing bath. In some embodiments, the sizing agent is dispersed or dissolved in water or an organic solvent, such as acetone, and used as a dispersion liquid or solution. From the viewpoint of enhancing the dispersibility of the sizing agent and improving liquid stability, a surfactant may be appropriately added to the dispersion liquid or solution.

The attached amount of the sizing agent to the carbon fibers is, for example, from 0.1 to 10 parts by mass when the total amount of the carbon fibers and the sizing agent is 100 parts by mass. When the attached amount is within this range, appropriate collectability of the carbon fibers can be obtained, sufficient scratch resistance of the carbon fibers can be obtained, and generation of fluff due to mechanical friction and the like is suppressed.

(Step of Winding Carbon Fiber)

The recycle method according to the embodiment may include the step of winding the carbon fiber, from which the resin has been removed, obtained by the removing step. The step of winding the carbon fibers can be performed after the removing step, and when the sizing agent adding step is included, the step of winding the carbon fibers can be performed after the sizing agent adding step.

In one embodiment, the carbon fibers can be wound up at downstream while drawn at the upstream, and the sizing agent adding step can be performed after being drawn and before being wound up. The immersing step and the removing step can be performed after being drawn or before being drawn.

With the recycle method of carbon fibers including the above-described steps, remaining of the resin or the component derived from the resin in the recycled carbon fibers can be suppressed. That is, the recycle method of carbon fibers including the above-described steps allows efficiently obtaining the carbon fibers suitable for recycle. Examples of these embodiments will be described in the following FIGS. 3 to 7. Note that, the examples of these embodiments illustrated in all of FIGS. 3 to 7 do not illustrate the molded product preparing step or the sizing agent adding step. The carbon fiber reinforced plastic molded product provided for the process step of each embodiment is prepared by the molded product preparing step. Additionally, in the example of each embodiment, the sizing agent adding step may be optionally performed.

Figure 3:
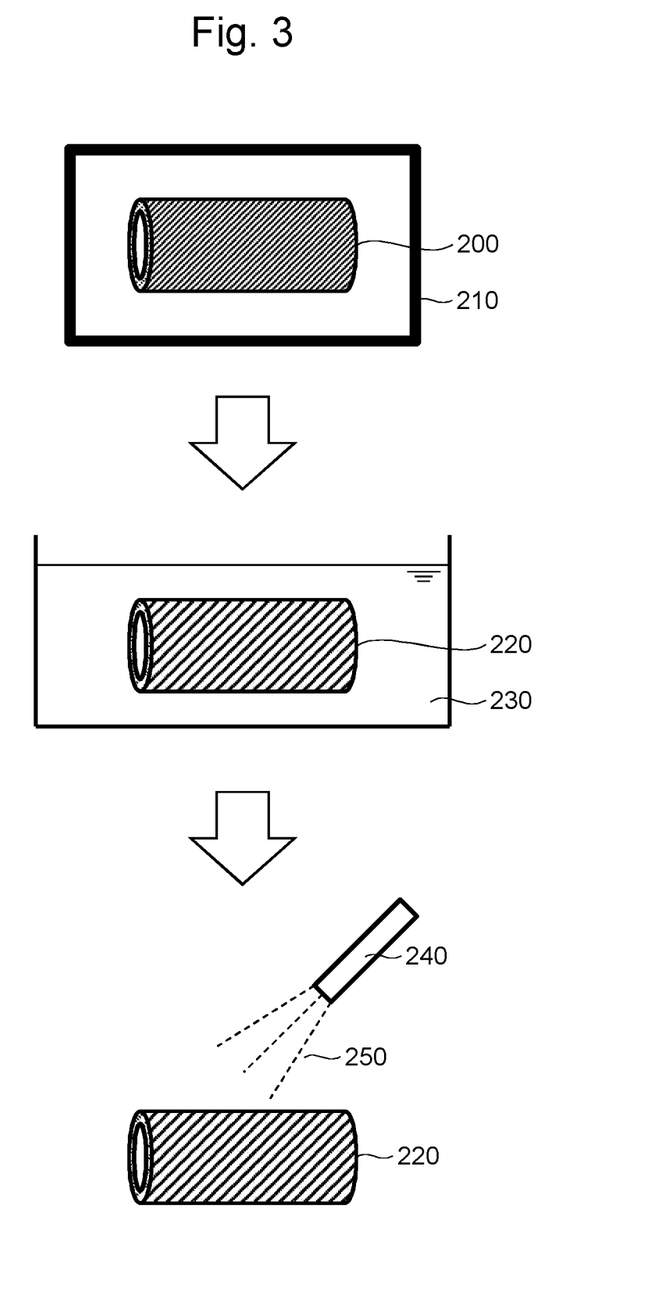
FIG. 3 is a schematic diagram for describing one aspect of the embodiment.

FIG. 3 is a schematic diagram for describing one aspect of the embodiment. In the embodiment illustrated in FIG. 3, after the process step is performed, the immersing step is performed, and subsequently the removing step is performed. Specifically, a carbon fiber reinforced plastic molded product 200 is housed in a processing device 210, such as a heat treatment chamber, where a heat treatment and an ultraviolet process can be performed, and the process is performed. Next, the whole carbon fiber reinforced plastic molded product 220 after the process is immersed in a second liquid 230. Next, a first liquid 250 is injected from a nozzle 240 coupled to an injection device (not illustrated) to the carbon fiber reinforced plastic molded product 220 after the process to remove the resin after the process from the carbon fiber. Although not illustrated, in the removing step, for example, by moving the position of the nozzle that injects the first liquid and the carbon fiber reinforced plastic molded product, the first liquid is injected to the whole carbon fiber. A plurality of the nozzles may be disposed. A conveyance method of the carbon fiber reinforced plastic molded product between the respective steps is not specifically limited, and an example of the method includes buoyancy propulsion conveyance in which the carbon fiber reinforced plastic molded product proceeds while being rotated by buoyancy. Moreover, although not illustrated, after the removing step, the drawing step of the carbon fibers and the winding step are performed in some embodiments, and the sizing agent adding step is performed after the drawing step and before the winding step in some embodiments. A step of drying the carbon fibers after the removing step and the carbon fibers after the sizing agent adding step may be performed.

Figure 4:
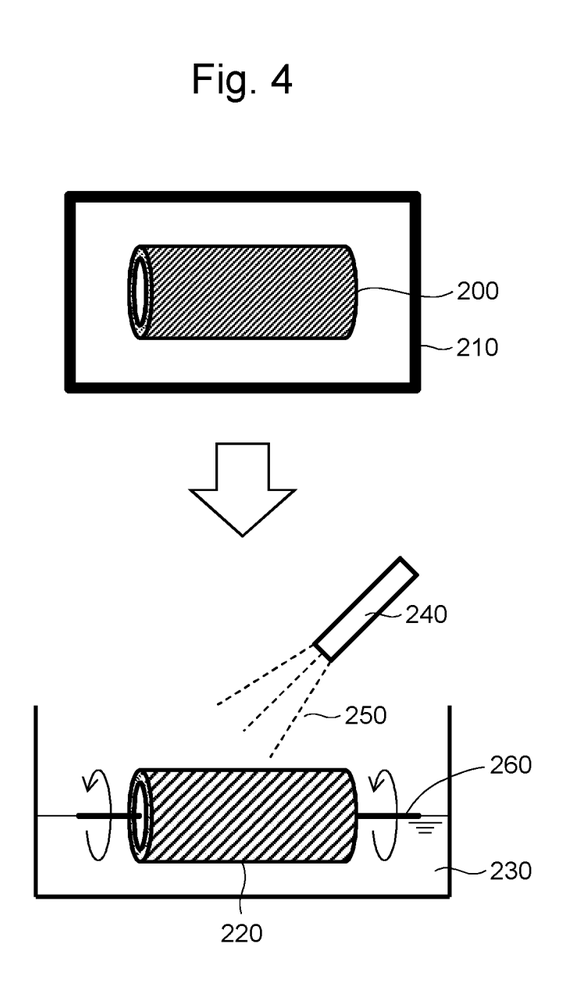
FIG. 4 is a schematic diagram for describing one aspect of the embodiment.

FIG. 4 is a schematic diagram for describing one aspect of the embodiment. In the embodiment illustrated in FIG. 4, after the process step is performed, the immersing step and the removing step are simultaneously performed. Specifically, the carbon fiber reinforced plastic molded product 200 is housed in the processing device 210, such as a heat treatment chamber, where a heat treatment and an ultraviolet process can be performed, and the process is performed. Next, the carbon fiber reinforced plastic molded product 220 after the process is immersed in the second liquid 230 up to a depth 50% or more in the vertical direction and from 50 to 90% in some embodiments. The carbon fiber reinforced plastic molded product after the process is supported to be rotatable around an approximately horizontal axis 260 that passes through the approximately center of a molded product. By rotating the carbon fiber reinforced plastic molded product after the process around the approximately horizontal axis, in a state where the whole carbon fiber reinforced plastic molded product after the process is immersed in the second liquid over time, the first liquid 250 is injected from the nozzle 240 coupled to the injection device (not illustrated), and the resin after the process is removed from the carbon fiber. Although not illustrated, in the removing step, for example, by moving the position of the nozzle that injects the first liquid, the first liquid is injected to the whole carbon fiber. A plurality of the nozzles may be disposed. The first liquid and the second liquid are the same kind of liquid in some embodiments. Moreover, although not illustrated, a part of the second liquid may be collected and supplied to the injection device to be injected as the first liquid in some embodiments. At this time, filtration or the like is performed on the collected second liquid, and the second liquid is supplied to the injection device after the purification in some embodiments. A conveyance method of the carbon fiber reinforced plastic molded product between the respective steps is not specifically limited, and includes, for example, a helical conveyance that passes through a core rod to the molded product, and moves the carbon fiber reinforced plastic molded product forward while rotating the carbon fiber reinforced plastic molded product. Moreover, although not illustrated, after the removing step, the drawing step of the carbon fibers and the winding step are performed in some embodiments, and the sizing agent adding step is performed after the drawing step and before the winding step in some embodiments. A step of drying the carbon fibers after the removing step and the carbon fibers after the sizing agent adding step may be performed.

Figure 5:
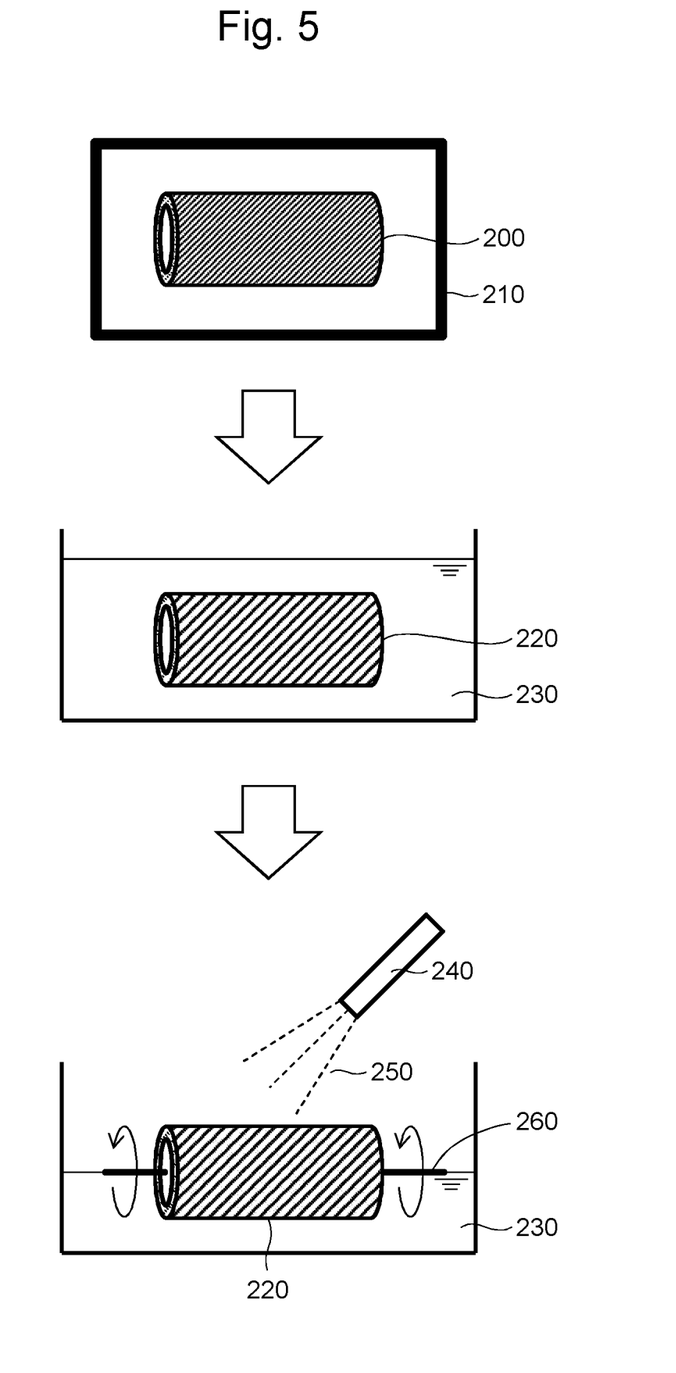
FIG. 5 is a schematic diagram for describing one aspect of the embodiment.

FIG. 5 is a schematic diagram for describing one aspect of the embodiment. In the embodiment illustrated in FIG. 5, the process step is performed, and after that the immersing step is performed, and subsequently the immersing step and the removing step are simultaneously performed. Specifically, the carbon fiber reinforced plastic molded product 200 is housed in the processing device 210, such as a heat treatment chamber, where a heat treatment and an ultraviolet process can be performed, and the process is performed. Next, the whole carbon fiber reinforced plastic molded product 220 after the process is immersed in the second liquid 230. Next, the carbon fiber reinforced plastic molded product 220 after the process is immersed in a second liquid 230 up to a depth 50% or more in the vertical direction and from 50 to 90% in some embodiments. The carbon fiber reinforced plastic molded product after the process is supported to be rotatable around the approximately horizontal axis 260 that passes through the approximately center of a molded product. By rotating the carbon fiber reinforced plastic molded product after the process around the approximately horizontal axis, in a state where the whole carbon fiber reinforced plastic molded product after the process is immersed in the second liquid over time, the first liquid 250 is injected from the nozzle 240 coupled to the injection device (not illustrated), and the resin after the process is removed from the carbon fiber. Although not illustrated, in the removing step, for example, by moving the position of the nozzle that injects the first liquid, the first liquid is injected to the whole carbon fiber. A plurality of the nozzles may be disposed. The first liquid and the second liquid when the immersing step and the removing step are simultaneously performed are the same kind of liquid in some embodiments. Moreover, although not illustrated, a part of the second liquid may be collected and supplied to the injection device to be injected as the first liquid in some embodiments. At this time, filtration or the like is performed on the collected second liquid, and the second liquid is supplied to the injection device after the purification in some embodiments. A conveyance method of the carbon fiber reinforced plastic molded product between the respective steps is not specifically limited, and includes, for example, buoyancy conveyance and a helical conveyance. Moreover, although not illustrated, after the removing step, the drawing step of the carbon fibers and the winding step are performed in some embodiments, and the sizing agent adding step is performed after the drawing step and before the winding step in some embodiments. A step of drying the carbon fibers after the removing step and the carbon fibers after the sizing agent adding step may be performed.

Figure 6:
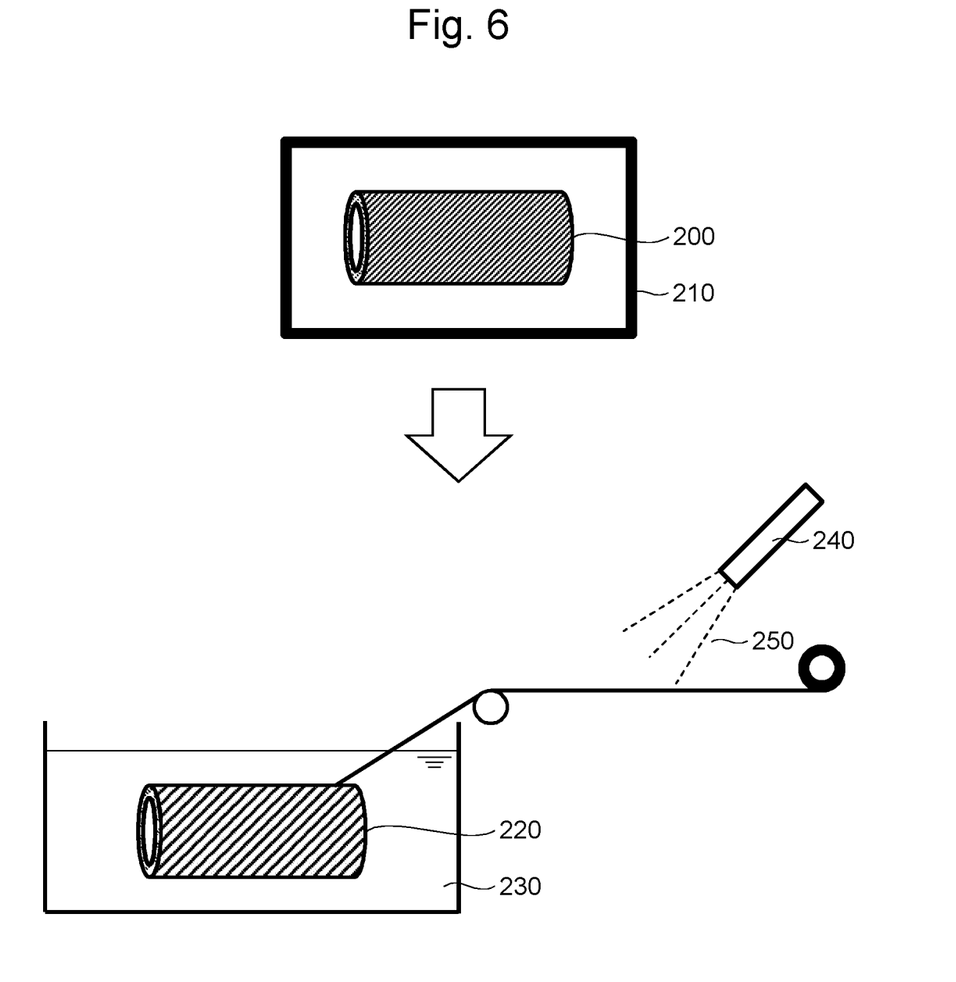
FIG. 6 is a schematic diagram for describing one aspect of the embodiment.

FIG. 6 is a schematic diagram for describing one aspect of the embodiment. In the embodiment illustrated in FIG. 6, after the process step is performed, the immersing step is performed, the step of drawing the carbon fibers is performed, and subsequently the removing step is performed. Specifically, the carbon fiber reinforced plastic molded product 200 is housed in the processing device 210, such as a heat treatment chamber, where a heat treatment and an ultraviolet process can be performed, and the process is performed. Next, the whole carbon fiber reinforced plastic molded product 220 after the process is immersed in the second liquid 230. Next, the carbon fibers are drawn from the immersed carbon fiber reinforced plastic molded product 220. Next, the first liquid 250 is injected from the nozzle 240 coupled to the injection device (not illustrated) to the drawn carbon fibers to remove the resin after the process from the carbon fiber. A plurality of the nozzles may be disposed. After the first liquid is injected, that is, after the removing step, the carbon fibers can be wound up by the winding step. The conveyance method of the carbon fiber reinforced plastic molded product and the carbon fibers between the respective steps is not specifically limited, and examples of which include a guide roller, a winding roller, and a mandrel roller. Although not illustrated, the sizing agent adding step is performed after the removing step and before the winding step in some embodiments. A step of drying the carbon fibers after the removing step and the carbon fibers after the sizing agent adding step may be performed.

Figure 7:
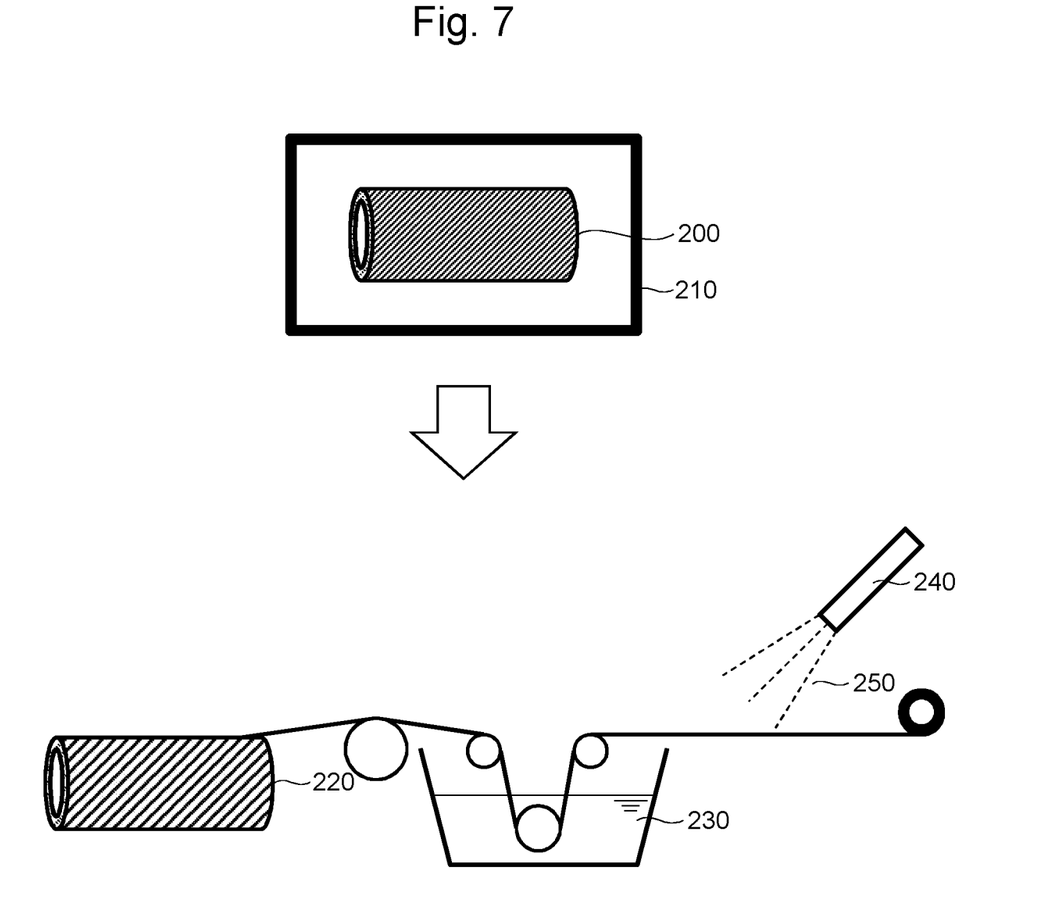
FIG. 7 is a schematic diagram for describing one aspect of the embodiment.

FIG. 7 is a schematic diagram for describing one aspect of the embodiment. In the embodiment illustrated in FIG. 7, after the process step is performed, the step of drawing the carbon fibers is performed, the immersing step is performed, and subsequently the removing step is performed. Specifically, the carbon fiber reinforced plastic molded product 200 is housed in the processing device 210, such as a heat treatment chamber, where a heat treatment and an ultraviolet process can be performed, and the process is performed. Next, the carbon fibers are drawn from the carbon fiber reinforced plastic molded product 220 after the process. Next, the drawn carbon fibers are immersed in the second liquid 230. Next, the first liquid 250 is injected from the nozzle 240 coupled to the injection device (not illustrated) to the drawn carbon fibers to remove the resin after the process from the carbon fiber. A plurality of the nozzles may be disposed. After the first liquid is injected, that is, after the removing step, the carbon fibers can be wound up by the winding step. The conveyance method of the carbon fiber reinforced plastic molded product and the carbon fibers between the respective steps is not specifically limited, and examples of which include a guide roller, a winding roller, and a mandrel roller. Although not illustrated, the sizing agent adding step is performed after the removing step and before the winding step in some embodiments. A step of drying the carbon fibers after the removing step and the carbon fibers after the sizing agent adding step may be performed.

According to the method of recycling carbon fibers of the embodiment described above, the carbon fibers suitable for recycle can be obtained. Additionally, even when the carbon fibers are continuous fibers, the carbon fibers can be recycled, and therefore the obtained carbon fibers are applicable to wide applications.

Upper limit values and/or lower limit values of respective numerical ranges described in this specification can be appropriately combined to specify an intended range. For example, upper limit values and lower limit values of the numerical ranges can be appropriately combined to specify an intended range, upper limit values of the numerical ranges can be appropriately combined to specify an intended range, and lower limit values of the numerical ranges can be appropriately combined to specify an intended range.

While the embodiments have been described in detail, the specific configurations are not limited to the embodiments. Design changes within a scope not departing from the gist of the disclosure are included in the present disclosure.

DESCRIPTION OF SYMBOLS

10 Liner
20 Carbon fiber reinforced plastic layer
30 Valve-side base
40 End-side base
50 Valve
60 Protective layer
100 Tank
200 Carbon fiber reinforced plastic molded product
210 Processing device
220 Carbon fiber reinforced plastic molded product after process
230 Second liquid
240 Nozzle
250 First liquid
260 Approximately horizontal axis

What is claimed is:

1. A method of recycling carbon fibers comprising:
preparing a carbon fiber reinforced plastic molded product containing a carbon fiber reinforced plastic containing a carbon fiber and a resin;
performing a process of at least one of a heating process or an ultraviolet irradiation process on the carbon fiber reinforced plastic molded product; and
after the process, removing the resin after the process from the carbon fiber by applying a first liquid to at least the carbon fiber of the carbon fiber reinforced plastic molded product.

2. The method according to claim 1 comprising
immersing the carbon fiber reinforced plastic molded product in a second liquid after the process,
wherein the immersing is performed at least one of before or simultaneously with the removing of the resin step.

3. The method according to claim 1,
wherein the first liquid is applied to the carbon fiber reinforced plastic molded product.

4. The method according to claim 1,
wherein the first liquid is applied to the carbon fiber drawn from the carbon fiber reinforced plastic molded product.

5. The method according to claim 1,
wherein a nozzle pressure for injecting the first liquid is 1 MPa or more.

6. The method according to claim 1,
wherein the first liquid is at least one liquid selected from an acidic solution, an organic solvent, a hydrogen peroxide solution, or an ionic liquid.

7. The method according to claim 2,
wherein the second liquid is at least one liquid selected from an acidic solution, an organic solvent, a hydrogen peroxide solution, or an ionic liquid.

8. The method according to claim 6,
wherein the organic solvent is at least one organic solvent selected from an aliphatic hydrocarbon-based solvent, an aromatic hydrocarbon-based solvent, an alcohol-based solvent, a ketone-based solvent, an ether-based solvent, an amide-based solvent, and an ester-based solvent.

9. The method according to claim 1,
wherein the first liquid has a temperature of from 0 to 100° C.

10. The method according to claim 2,
wherein the second liquid has a temperature of from 0 to 100° C.

11. The method according to claim 1,
wherein the heating process is a process that heats the carbon fiber reinforced plastic molded product at a temperature of 400° C. or more.

12. The method according to claim 1,
wherein the heating process is performed with air purged.

* * * * *